US012618734B2

(12) United States Patent
Sailer

(10) Patent No.: US 12,618,734 B2
(45) Date of Patent: May 5, 2026

(54) DIFFERENTIAL PRESSURE MEASURING DEVICE FOR OIL TEST

(71) Applicant: AVL LIST GMBH, Graz (AT)

(72) Inventor: Wolfgang Sailer, Graz (AT)

(73) Assignee: AVL LIST GMBH, Graz (AT)

( * ) Notice: Subject to any disclaimer, the term of this patent is extended or adjusted under 35 U.S.C. 154(b) by 433 days.

(21) Appl. No.: 18/036,409

(22) PCT Filed: Nov. 10, 2021

(86) PCT No.: PCT/AT2021/060426

§ 371 (c)(1),
(2) Date: May 11, 2023

(87) PCT Pub. No.: WO2022/099341

PCT Pub. Date: May 19, 2022

(65) Prior Publication Data

US 2024/0003767 A1     Jan. 4, 2024

(30) Foreign Application Priority Data

Nov. 11, 2020    (AT) .............................. A 50973/2020

(51) Int. Cl.
G01L 9/00          (2006.01)
G01L 19/00         (2006.01)

(52) U.S. Cl.
CPC ........ G01L 9/0041 (2013.01); G01L 19/0007 (2013.01); G01L 19/0092 (2013.01)

(58) Field of Classification Search
None
See application file for complete search history.

(56) References Cited

U.S. PATENT DOCUMENTS

| | | | |
|---|---|---|---|
| 3,247,717 A | 4/1966 | Kemmer et al. | |
| 5,625,152 A | 4/1997 | Pandorf et al. | |
| 2005/0072242 A1* | 4/2005 | Fandrey | .............. G01L 19/0672 |
| | | | 73/706 |
| 2020/0080906 A1 | 3/2020 | Kangi | |

FOREIGN PATENT DOCUMENTS

| | | |
|---|---|---|
| CN | 110793711 A | 2/2020 |
| DE | 1 473 505 A1 | 11/1968 |
| DE | 698 14 112 T2 | 10/2003 |
| DE | 697 34 025 T2 | 6/2006 |
| DE | 10 2008 054 226 A1 | 5/2010 |
| JP | 2005-164538 A | 6/2005 |
| WO | WO-2009096379 A1 * | 8/2009 ......... G01L 19/0023 |

* cited by examiner

*Primary Examiner* — Eric S. McCall
*Assistant Examiner* — Nigel H Plumb
(74) *Attorney, Agent, or Firm* — Norman B. Thot

(57)          ABSTRACT

A pressure measuring device includes a pressure gauge having a pressure measuring member, at least one connection line which connects the pressure gauge to a measured media source, a connection block which is fluidically connected to the pressure gauge, a heating element and/or cooling element which controls a temperature of the connection block, and at least one closable vent hole which is arranged in the connection block. A section of the at least one connection line which is connected to the pressure measuring member is arranged in the connection block. The at least one closable vent hole is arranged to branch off from the at least one connection line in an ascending manner and to open above the at least one connection line.

22 Claims, 4 Drawing Sheets

DIFFERENTIAL PRESSURE MEASURING DEVICE FOR OIL TEST

CROSS REFERENCE TO PRIOR APPLICATIONS

This application is a U.S. National Phase application under 35 U.S.C. § 371 of International Application No. PCT/AT2021/060426, filed on Nov. 10, 2021 and which claims benefit to Austrian Patent Application No. A50973/2020, filed on Nov. 11, 2020. The International Application was published in German on May 19, 2022 as WO 2022/099341 A2 under PCT Article 21(2).

FIELD

The present invention relates to a pressure measuring device with a pressure gauge having a pressure measuring element and a connection line via which the pressure gauge is connected with a measured media source.

BACKGROUND

Such pressure measuring devices are used, for example, for measuring an oil pressure or a differential pressure of fluids in test stands. The measurement of a hydrostatic pressure in an oil sump of a test bench should in particular be mentioned. It is also known to determine a differential pressure between the oil in the oil sump and the gas in the part of the oil sump which is not filled with oil via pressure transmitter systems in order to determine the filling level of the oil sump. A differential pressure in the piping system of a test stand can also be used to determine oil consumption so that a measurement medium source is understood to mean both pipes in which there is a flow as well as containers or tanks in which the measurement medium is essentially stationary, i.e., only a small mass exchange takes place. Either sensors or, in the case of most pressure transmitters, diaphragms serve as pressure measuring elements.

Due to the strong vibrations that occur for pressure measurement, pressure transmitter systems are mostly used for measurement in which the process pressure acts via a diaphragm on a liquid in a capillary tube, which then deflects the measuring body of the pressure transmitter, which serves as a scale for determining the process pressure. This is accordingly a closed measuring system in which no exchange of the fluid acting on the measuring body exists. It has, however, been found that with rapid temperature changes and high temperatures, that the measurement results of such a system cause errors in the pressure measurement due to the thermal expansion of the fluid in the pressure transmitting system due to the changing density of the fluid. Although attempts are made to compensate these errors mostly using software-based compensation methods, the results are usually not satisfactory since measurement accuracies of up to 0.5 Pa are required.

The previously described embodiments accordingly have the disadvantage that a temperature influence on the measuring devices cannot be eliminated, in particular since the temperatures of the measuring medium do not correspond to the temperatures of the fluid at the measuring body.

SUMMARY

An aspect of the present invention is therefore to provide a pressure measuring device which provides exact measuring results independent of the temperature variation of the measuring medium.

In an embodiment, the present invention provides a pressure measuring device which includes a pressure gauge comprising a pressure measuring member, at least one connection line which is configured to connect the pressure gauge to a measured media source, a connection block which is fluidically connected to the pressure gauge, at least one of a heating element and a cooling element which is/are configured to control a temperature of the connection block, and at least one vent hole which is configured to be closable and which is arranged in the connection block. The connection block is configured so that a section of the at least one connection line which is connected to the pressure measuring member is arranged therein. The at least one vent hole is arranged to branch off from the at least one connection line in an ascending manner and to open above the at least one connection line.

BRIEF DESCRIPTION OF THE DRAWINGS

The present invention is described in greater detail below on the basis of embodiments and of the drawings in which.

DETAILED DESCRIPTION

Figure 1:
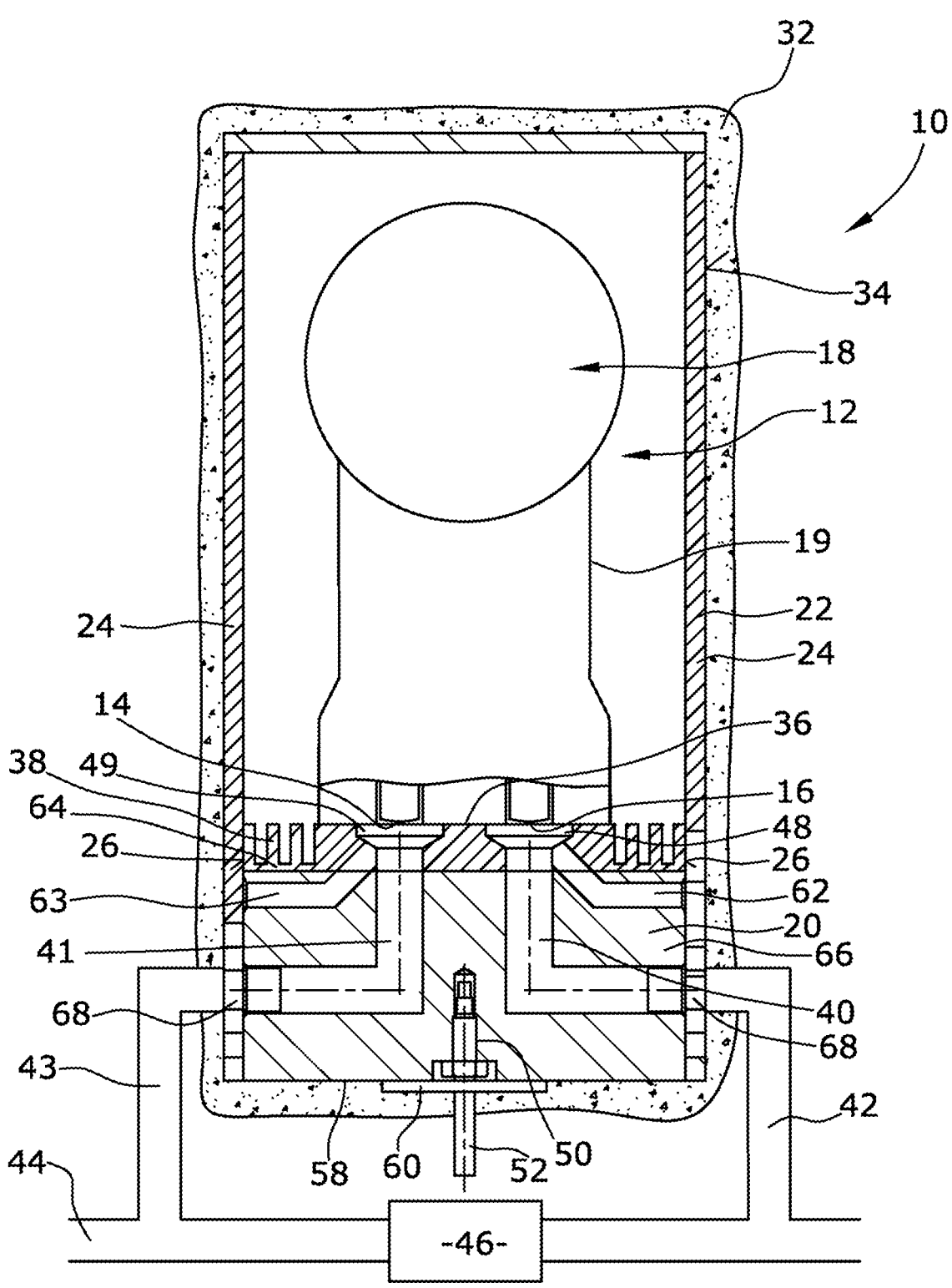
FIG. 1 shows a top view of a pressure measuring device according to the present invention in a partially cutaway view.
Figure 2:
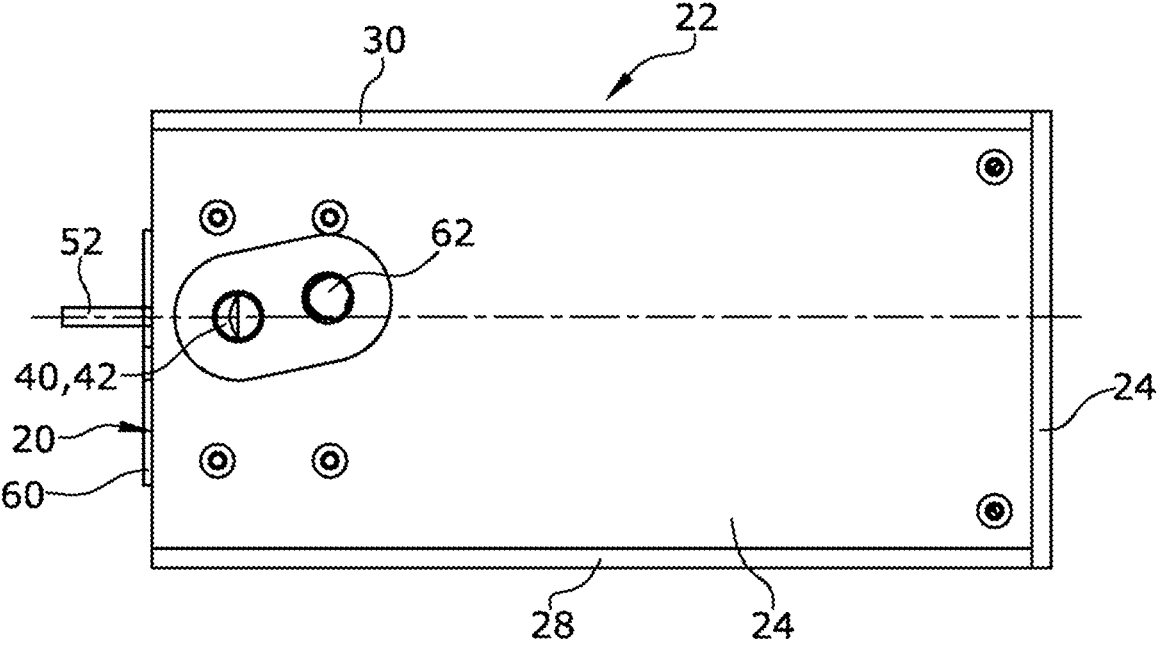
FIG. 2 shows a side view of the pressure measuring device according to the present invention from FIG. 1.
Figure 3:
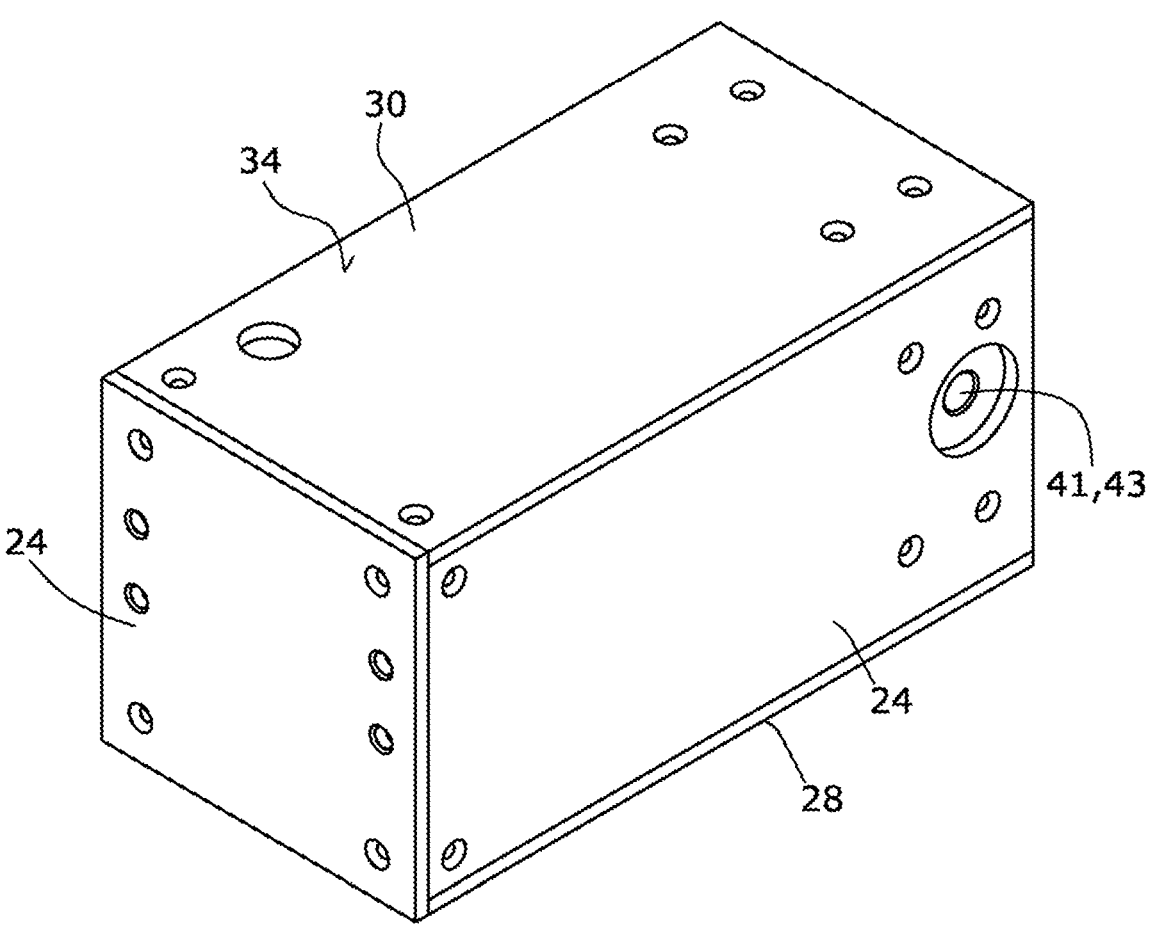
FIG. 3 shows a perspective view of the pressure measuring device according to the present invention from FIG. 1.
Figure 4:
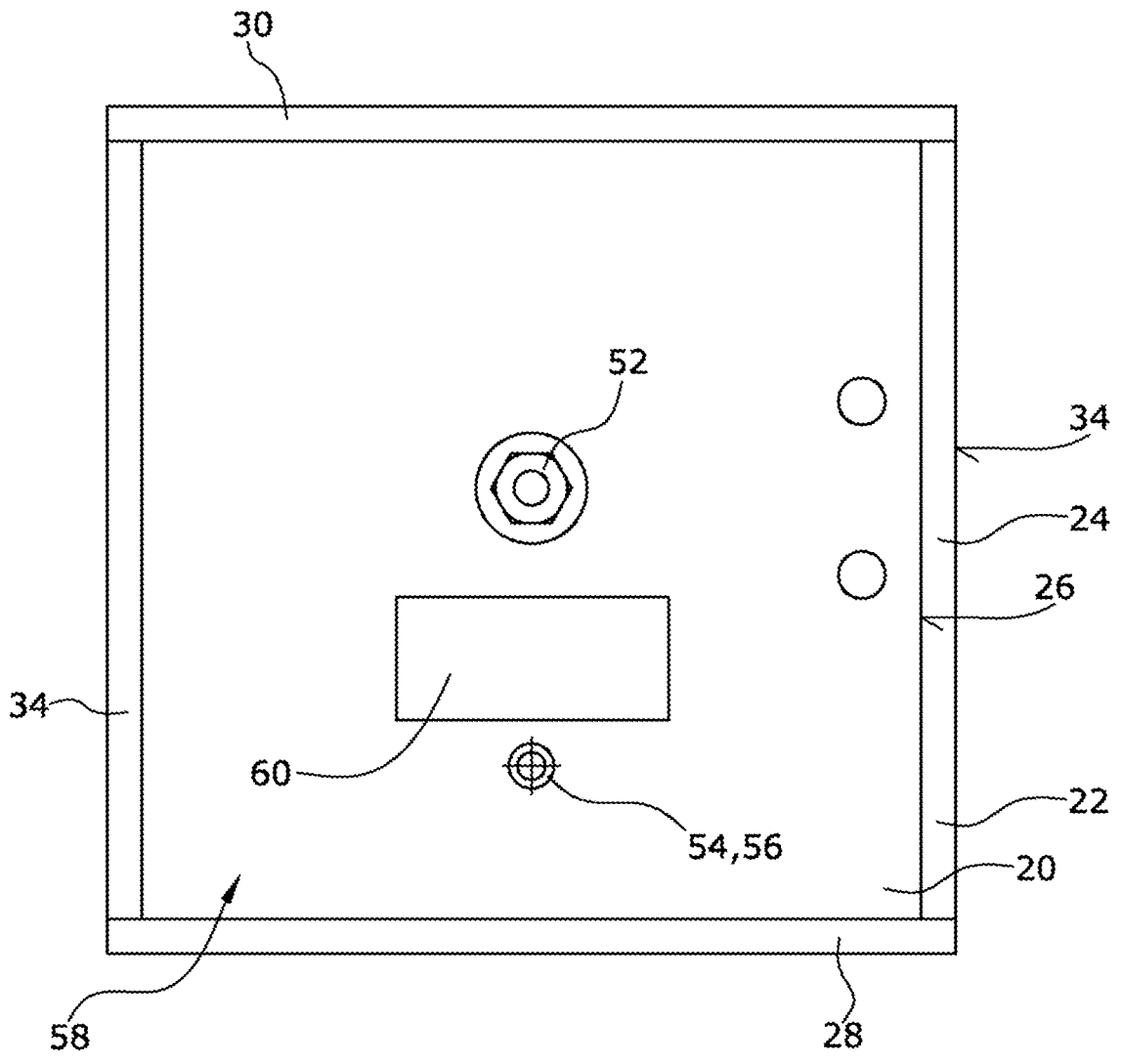
FIG. 4 shows a front view of the pressure measuring device according to the present invention from FIG. 1.

The pressure measuring device according to the present invention comprises a pressure gauge, which may be configured as a pressure sensor or pressure transmitter and comprises a pressure measuring member, such as a diaphragm. This can be arranged in a pressure gauge housing. The pressure gauge is connected via a connection line to a measured media source, i.e., in particular to a fluid source, which can be defined by both a line through which the fluid flows and a container or tank in which the fluid is stored and thus is stationary, except for a small exchange due to consumption or refilling in this case. According to the present invention, the pressure gauge is fluidically connected to a connection block, the temperature of which can be controlled by heating and/or cooling elements, and in which a section of the connection line connected to the pressure measuring member is configured. The pressure gauge housing in which the pressure measuring members are arranged is accordingly usually connected with the connection block. The fluid flowing into the connection block, before reaching the pressure measuring member, is therefore cooled or heated to the temperature of the connection block since it must flow therethrough. The connection block is, for example, controlled to an average expected temperature of the fluid. Since an exchange of fluid in the connection block is possible since it is an open measuring system with mass exchange, but no large volumetric throughflows occur in the connection block. The average residence time of the measuring fluid in the connection block is also relatively high so that an almost constant temperature of the measuring medium can be expected even with changes in the process temperature at the measuring member. The connection lines or the connection block thus serve as a buffer in the event of sudden temperature changes in the environment or the measured medium. Very precise measurement results can therefore be obtained by eliminating the influence of temperature and the resulting change in density of the measured medium. The heating or cooling elements can, for example, be configured as heating cartridges, heating foils or as Peltier elements. By configuring the system as an open system, the measured medium in the connection lines can also be regulated to any temperature, which does not lead to any falsification of the measurement result since a mass balance with the environment, i.e., with the lines or the tank, can take place.

The connection block can, for example, be controlled to a constant temperature via the heating and or cooling elements so that no temperature changes must be considered in the pressure measurement and temperature gradients at the diaphragm are prevented.

In an advantageous embodiment of the present invention, the pressure gauge can, for example, be attached to the connection block via a pressure gauge housing, and is fluidically connected to the connection block via a connection port in the connection block, thereby providing that the fluid is also provided to the pressure gauge at the desired temperature and that subsequent temperature changes due to downstream lines are prevented. This design also reduces the space required.

The one or more connection lines can, for example, run horizontally. The reference point for this horizontal arrangement is the center of the earth. It is therefore important that the same gravitational force acts in each section of the channel so that density differences within the connection line that could lead to falsification of the measurement results are excluded. Such density changes could be caused by temperature differences of the measured medium as well as by diffusion processes or gas bubbles. The connection line can be led out of the connection block either at the front, and thus opposite the connection openings to the pressure gauge, or at the side.

It is furthermore advantageous if a closable vent hole is configured in the connection block which branches off from the connection line in an ascending manner and leads above the connection line. One vent hole or, for example, two vent holes can in particular be provided. If two vent holes are provided, two connection lines can, for example, also be provided. In contrast, if only one vent hole is provided, the one vent hole in particular leads above a single connection line. These vent holes can in particular be configured horizontally in the connection block in the area close to the outer wall in order to facilitate their closure.

The opening of the vent hole to the connection line can, for example, also be located in the area of connection openings of the connection lines to the pressure gauge. The vent holes are closed during the measuring process. Gas bubbles present in the measured medium would be collected in the vent hole as the highest point. The vent hole is opened between measurements so that gas bubbles can be removed from the measured medium via the vent holes in the process of a purging operation, as these bubbles rise due to the lower density in the medium. A compressible behavior of the measured medium due to heterogeneous mixture formation caused by gas bubbles present in the measured medium is thereby reliably prevented, thus improving the measurement results.

The pressure gauge can, for example be arranged in an outer housing which is connected with the connection block and which surrounds the pressure gauge. A spatial separation of the pressure gauge from the external environment is thereby achieved so that heat transfer from the outside to the pressure gauge is prevented.

The connection block can, for example, be made of a material with a thermal conductivity of more than 100 W/mK, for example, of aluminum. This allows the heat introduced into the connection block via the cooling or heating elements to be distributed quickly in the connection block so that short-term and rapid control is possible.

The outer housing is advantageously made of a material with a thermal conductivity of more than 100 W/mK, which improves heat transfer from the connection block to the outer housing and through the outer housing. With the temperature control of the connection block, there is accordingly also a control of the outer housing temperature.

In a further embodiment of the present invention, the outer housing and/or the connection block can, for example, comprise a reflective, outwardly facing surface so that the absorption coefficient for thermal radiation is reduced as it is largely reflected.

The outer housing and the connection block can, for example, surround the pressure gauge on all sides, wherein side walls of the outer housing extend along side surfaces of the connection block. Surrounding the pressure gauge on all sides results in a closed system into which energy can enter or leave almost exclusively through the measured medium, thereby making it much easier to maintain the temperature constant. The large-area attachment of the side surfaces of the outer housing to the connection block also establishes good and large-area heat conduction between the connection block and the outer housing, which again results in a reduction of existing temperature gradients.

It is also advantageous if webs are configured on a side surface of the connection block facing the inside of the outer housing. These can be produced, for example, by milling into the surface of the connection block, thereby leading to an increase in the surface area, which increases convection within the outer housing and accordingly results in faster temperature equalization between the connection block and the housing interior. It can in principle also be advantageous if the webs are configured as fins or if these are replaced by an additional component such as a heat sink.

If the outer housing is also surrounded by insulation, an exchange of thermal energy between the outer housing or the connection block and the environment is also reduced, which makes it much easier to maintain the temperature constant independent of the ambient conditions.

The pressure gauge can, for example, be a pressure transmitter with a diaphragm that is pressurized by the fluid from the connection line. Such pressure transmitters are insensitive to contamination or corrosion and are manufactured inexpensively as mass products.

Measurement errors due to capillary effects occurring in narrow gaps are prevented by making the diameter of connection openings to the pressure transmitter in the connection block at least as large as the diameter of the diaphragm. The connection openings can be widened by simple counterbores therefor.

The pressure gauge is advantageously a differential pressure gauge, wherein a section of the first connection line connected with the pressure gauge and a section of a second connection line connected with the pressure gauge are configured in the connection block. The two connection lines can either lead to different process line sections, so that a differential pressure is measured, or one connection line is connected with the measuring fluid in a container and the other connection line is connected with the space above, so that a filling level can, for example, be determined.

In a further embodiment of the present invention, the differential pressure gauge can, for example, be a differential pressure transmitter with two pressure measuring members, wherein the first pressure measuring member is pressurized by a medium from the first connection line and the second pressure measuring member is pressurized by a medium from the second connection line. A differential pressure is then calculated via difference calculation in the pressure transmitter. A differential pressure between a liquid and a gas can also be measured and calculated in this process.

It is furthermore advantageous if a temperature sensor is arranged centrally with respect to the pressure measuring member for controlling the temperature of the connection block with respect to height. The temperature over which the temperature of the connection block is controlled thereby remains independent of any temperature variations within the connection block.

In a further embodiment of the present invention, the temperature sensor can, for example, be arranged symmetrically between the pressure measuring members or centrally with respect to the pressure measuring member so that temperature gradients present laterally also have no influence on the control of the temperature of the connection block. With this arrangement, it can always be assumed that it is an average temperature that is being measured since the connection block should always comprise an average temperature at this position.

If the two pressure measuring members are arranged horizontally to each other, i.e., arranged at the same height to the center of the earth, no errors due to any vertical temperature gradients that may exist will occur, as a result of which different temperatures would be present at the diaphragms. This improves the measurement results.

The connection block can, for example, be configured in two parts, wherein a first connection block part comprises the connection openings to the pressure gauge and the second connection block part comprises the connections to the continuing connection lines. This two-part design provides that even if different pressure transmitters or pressure sensors are used, the same block can always be used to connect the process lines in which the temperature sensors and the heating and cooling elements are arranged.

Heating or cooling elements can, for example, also be attached to the side surfaces of the connection block or in holes in the connection block, arranged symmetrically to the pressure measuring member or symmetrically between the pressure measuring members. Both pressure measuring members thereby always comprise the same temperature.

A measuring device is thus provided with which the real pressure equation is adapted to the ideal pressure equation via constructive means, wherein measurements are made at a constant temperature by appropriately controlling the temperature of the connection block and are made on homogeneous measuring media, wherein occurring temperature gradients in the connection block, in the outer housing, or on the pressure measuring members, which could falsify the measurements, are prevented. Very precise measurement results are thus obtained independent of occurring temperature fluctuations of the measured medium or the environment.

An example of an embodiment of a pressure measuring device according to the present invention is shown in the drawings and is described below.

The pressure measuring device 10 according to the present invention, as shown in the drawings, comprises a pressure gauge 12 which is designed as a pressure transmitter with two pressure measuring members 14, 16 in the form of diaphragms, via which a pressure signal is respectively generated and converted into a pressure in an electronic unit 18 in the pressure gauge 12 so that a differential pressure can be output via difference calculation in the electronic unit 18. The electronic unit 18 and the pressure measuring members 14, 16 are arranged in a pressure gauge housing 19, which may consist of several parts.

The pressure gauge 12 is attached with the connection side, on which the pressure measuring members 14, 16 are arranged, to a connection block 20 which is made, for example, of an aluminum alloy and accordingly comprises a thermal conductivity coefficient of approximately 200 W/mK.

Attached to this connection block 20 is an outer housing 22 which is composed of the same material and whose side walls 24 fully cover outer side surfaces 26 of the connection block 20 and are attached thereto. The outer housing 22 comprises a bottom portion 28, three side walls 24, and a cover portion 30. The fourth side surface is closed by the connection block 20 so that the pressure gauge 12 is surrounded on all sides by the material, which is a good conductor of heat. Insulation 32 is arranged around the connection block 20 and the outer housing 22. The connection block 20 and the outer housing 22 comprise bare, outwardly facing reflective surfaces 34 which are correspondingly highly reflective. Milled grooves are configured on a side surface 36 of the connection block 20 facing toward the interior of the outer housing 22, thereby forming inwardly facing webs 38.

Sections 40, 41 of two horizontally extending connection lines 42, 43 are formed in the connection block, which lead into a process line, which in the present embodiment defines a measured media source 44 in which an aggregate 46 generating a pressure difference is arranged, wherein the first connection line 42 leads into the process line upstream of the aggregate 46, and the second connection line 43 leads into the process line downstream of the aggregate 46, so that a pressure difference exists between the opening points which is measured via the pressure gauge 12.

The connection block, which is made of massive material, has bores for forming the sections 40, 41 of the connection lines 42, 43, which extend horizontally with respect to the center of the earth and perpendicularly to the outer side surfaces 26, to which the side walls 24 of the outer housing 22 are also attached, into the interior of the connection block 20, where they have a 900 deflection and subsequently extend perpendicularly in the direction of the side surface 36 facing into the interior of the outer housing 22, where they establish a connection via connection openings 48, 49 to the pressure gauge 12 fastened at this position, the pressure measuring members 14, 16 of which are formed opposite the connection openings 48, 49, which, like the pressure measuring members 14, 16, are arranged at the same geodetic height in the installed state, the connection openings 48, 49 each being arranged concentrically to the opposite pressure measuring members 14, 16. The connection openings 48, 49 comprise counterbores via which the diameter of the connection openings 48, 49, which are arranged opposite the pressure measuring members 14, 16, is somewhat enlarged so that errors due to capillary forces occurring are avoided.

A bore 50 is also formed on the connection block 20 for receiving a temperature sensor 52 which is arranged exactly centrally between the pressure measuring members 14, 16 with respect to both the vertical and the horizontal direction.

A bore 54 is also formed symmetrically to the pressure measuring members 14, 16 in the connection block 20 for receiving a heating cartridge serving as a heating element 56. A Peltier element is attached to the side surface 58 opposite the side surface 36 and serves as a cooling element 60 of the connection block 20.

Vent holes 62, 63 also extend obliquely upwardly from the sections 40, 41 of the connection lines 42, 43 formed in the connection block 20 and, in particular, in the immediate vicinity of the connection openings 48, 49 and, in the further course, horizontally to the outer side surfaces 26 of the connection block 20, in which corresponding openings are arranged. These vent holes 62, 63 are opened for a purging operation to remove gas bubbles from the fluid and are closed during the measurement.

The connection block 20 is configured in two parts in the present embodiment, wherein the connection openings 48, 49 for the pressure gauge 12 are configured on the first connection block part 64, and connections 68 for the connection lines 42, 43 and the bores 50, 54 for the heating elements 56 and the temperature sensors 52 are configured on the second connection block part 66. Different pressure gauges 12 can accordingly be used for which only the first connection block part 64 must be replaced.

If a differential pressure is now to be measured via the pressure measuring device 10, the connection lines 42, 43 are first purged, whereby gas bubbles are removed from the fluid via the vent holes 62, 63. The vent holes 62, 63 are then closed. At the same time, the connection block 20 can be heated or cooled to a desired temperature by energizing the heating and/or cooling elements 56, 60 according to the measured temperature of the temperature sensors 52 until the desired temperature is reached. This temperature of the connection block 20 is also transferred to the outer housing 22 in a short time due to the large-area connection. A faster heating of the pressure gauge 12 also results from the large-area connection between the connection block 20 and the pressure gauge housing 19. Since the outer housing 22 also surrounds the pressure gauge 12, the desired temperature is established in the pressure gauge 12 which is also easily maintained by the surrounding insulation 32 since only small amounts of heat are transmitted by radiation. Penetration of thermal radiation is also reduced by the reflective surface 34. The following differential pressure measurement thus takes place at constant temperatures.

If temperature gradients and resulting density differences should, however, occur in the media or in the connection block 20, these also do not have a major influence on the measurements since with this arrangement, average values are always determined over the diaphragms, because the density differences can normally only occur in the vertical direction due to the concentric arrangement of the pressure measuring members 14, 16 to the connection lines 42, 43 and the horizontal configuration of the connection lines 42, 43 as well as the centric arrangement of the measuring sensors of the temperature sensor 52 to the pressure measuring members 14, 16. Density changes do not cause any change in the hydrostatic pressure with this horizontal configuration of the connection lines 42, 43. The connection block 20 also acts as a buffer with respect to temperature changes in the event of rapid temperature fluctuations.

An open pressure measuring device is accordingly provided with which the pressure of a measured media can be measured with high precision, wherein measurement errors due to density differences caused by expansion caused by temperature differences occurring are avoided.

It should be clear that the scope of protection is not delimited to the described embodiment. The connection block can thus also be configured as one-piece. The measurement can also be carried out as an absolute pressure measurement with only one pressure measuring member and only via one connection line. One connection line can also be pressurized with a liquid and the other with a gas, as is performed, for example, in hydrostatic level measurement in an oil or fuel tank. The vent hole on the gas side of the connection block can in this case be dispensed with. A differential pressure gauge according to the present invention can thus be used both on a flowed-through line as well as on a substantially static fluid. Further design changes also are apparent for a person skilled in the art. Reference should also be had to the appended claims.

LIST OF REFERENCE NUMERALS

10 Pressure measuring device
12 Pressure gauge
14 Pressure measuring member
16 Pressure measuring member
18 Electronic unit
19 Pressure gauge housing
20 Connection block
22 Outer housing
24 Side wall
26 Outer side surface
28 Bottom portion
30 Cover portion
32 Insulation
34 Reflective surface
36 Side surface
38 Inwardly facing web
40 Section (of first connection line 42)
41 Section (of second connection line 43)
42 First connection line
43 Second connection line
44 Measured media source
46 Aggregate
48 Connection opening
49 Connection opening
50 Bore
52 Temperature sensor
54 Bore
56 Heating element
58 Side surface
60 Cooling element
62 Vent hole
63 Vent hole
64 First connection block part
66 Second connection block part
68 Connection

What is claimed is:

1. A pressure measuring device comprising:
   a pressure gauge comprising a pressure measuring member;
   at least one connection line which is configured to connect the pressure gauge to a measured media source;
   a connection block which is fluidically connected to the pressure gauge, the connection block being configured so that a section of the at least one connection line which is connected to the pressure measuring member is arranged therein;
   at least one of a heating element and a cooling element which is/are configured to control a temperature of the connection block; and at least one vent hole which is configured to be closable and which is arranged in the connection block, the at least one vent hole being arranged to branch off from the at least one connection line in an ascending manner and to open above the at least one connection line.

2. The pressure measuring device as recited in claim 1, wherein the at least one of the heating element and the cooling element is/are further configured control the temperature of the connection block to a constant temperature.

3. The pressure measuring device as recited in claim 1, wherein the at least one connection line extends horizontally.

4. The pressure measuring device as recited in claim 1, wherein the connection block is made of a material having a thermal conductivity of more than 100 W/mK.

5. The pressure measuring device as recited in claim 1, further comprising:

a pressure gauge housing which is configured to attach the pressure gauge to the connection block, wherein, the connection block comprises a connection opening arranged therein via which the pressure gage is fluidically connected to the connection block.

6. The pressure measuring device as recited in claim 5, wherein the connection block is provided as, a first connection block part which comprises the connection opening to the pressure gauge, and a second connection block part which comprises a connection to the at least one connection line.

7. The pressure measuring device as recited in claim 5, wherein the at least one vent hole is further configured open to the at least one connection line in a region of the connection opening of the at least one connection line to the pressure gauge.

8. The pressure measuring device as recited in claim 5, further comprising:

an outer housing which is connected to the connection block and which is arranged to surround the pressure gauge and to have the pressure gauge be arranged therein.

9. The pressure measuring device as recited in claim 8, wherein the outer housing is made of a material having a thermal conductivity of more than 100 W/mK.

10. The pressure measuring device as recited in claim 8, wherein at least one of the outer housing and the connection block comprises/comprise a reflective surface which is arranged to face outwards.

11. The pressure measuring device as recited in claim 8, wherein, the outer housing comprises side walls, the connection block comprises side surfaces, the outer housing and the connection block are configured to surround the pressure gauge on all sides thereof, and the side walls of the outer housing extend along the side surfaces of the connection block.

12. The pressure measuring device as recited in claim 11, wherein webs are formed on a side surface of one of the side surfaces of the connection block which faces an interior of the outer housing.

13. The pressure measuring device as recited in claim 8, further comprising:

an insulation which is configured to surround the outer housing.

14. The pressure measuring device as recited in claim 8, wherein, the pressure gauge is a pressure transmitter which comprises a diaphragm as a pressure measuring member, and the diaphragm is pressurized with a fluid from the at least one connection line.

15. The pressure measuring device as recited claim 14, wherein a diameter of the connection opening to the pressure transmitter in the connection block is at least as large as a diameter of the diaphragm.

16. The pressure measuring device as recited in claim 8, wherein, the at least one connection line is provided as a first connection line and a second connection line each of which comprise a section which is connected to the pressure gauge, the pressure gauge is a differential pressure gauge, and the section of the first connection line which connected to the pressure gauge and the section of the second connection line which is connected to the pressure gauge are each formed in the connection block.

17. The pressure measuring device as recited in claim 16, wherein, the differential pressure gauge is a differential pressure transmitter which comprises a first pressure measuring member and a second pressure measuring member, the first pressure measuring member is pressurized with a fluid from the first connection line, and the second pressure measuring member is pressurized with a medium from the second connection line.

18. The pressure measuring device as recited in claim 17, wherein the first pressure measuring member and the second pressure measuring member are each arranged at a height which is the same.

19. The pressure measuring device as recited in claim 18, further comprising:

a temperature sensor which is configured to control the temperature of the connection block with respect to the height, the temperature sensor being arranged centrally with respect to pressure measuring member.

20. The pressure measuring device as recited in claim 19, wherein, the temperature sensor is arranged centrically to the pressure measuring member, or the temperature sensor is arranged symmetrically between the first pressure measuring member and the second pressure measuring member.

21. A pressure measuring device comprising:

a pressure gauge which comprises at least one pressure measuring member;

at least one connection line which is configured to connect the pressure gauge to a measured media source;

a connection block which is fluidically connected to the pressure gauge, the connection block comprising at least one bore and side surfaces, the connection block being configured so that a section of the at least one connection line which is connected to the at least one pressure measuring member is arranged therein;

at least one heating element and at least one cooling element which are configured to control a temperature of the connection block; and at least one vent hole which is configured to be closable and which is arranged in the connection block, the at least one vent hole being arranged to branch off from the at least one connection line in an ascending manner and to open above the at least one connection line.

22. A pressure measuring device comprising:

a pressure gauge which comprises one or more pressure measuring member(s);

at least one connection line which is configured to connect the pressure gauge to a measured media source;

a connection block which is fluidically connected to the pressure gauge, the connection block comprising at least one bore and side surfaces, the connection block being configured so that a section of the at least one connection line which is connected to the one or more pressure measuring member(s) arranged therein;

at least one of a heating element and a cooling element which is/are configured to control a temperature of the connection block; and at least one vent hole which is configured to be closable and which is arranged in the connection block, the at least one vent hole being arranged to branch off from the at least one connection line in an ascending manner and to open above the at least one connection line, wherein, the at least one of the heating element and the cooling element is/are fastened to the side surfaces of the connection block or in the at least one bore in the connection block, and when the one or more pressure measuring member(s) is/are provided as a plurality of pressure measuring members, the at least one of the heating element and the cooling element is/are arranged symmetrically with respect to the plurality of pressure measuring members, or when the one or more pressure measuring member(s) is/are provided as one pressure measuring member, the at least one of the heating element and the cooling element is/are arranged centrally with respect to the one pressure measuring member.

* * * * *